United States Patent Office 2,983,629
Patented May 9, 1961

2,983,629

TREATING A CELLULOSE-CONTAINING BASE TO IMPART THERETO ACID RESISTANCE, COMPOSITION THEREFOR AND THE RESULTANT PRODUCT

Bryce P. Anderson, Lafayette, Calif., assignor to De Soto Chemical Coatings, Inc., a corporation of Delaware No Drawing. Filed June 13, 1958, Ser. No. 741,728

19 Claims. (Cl. 117—148)

My invention relates to compositions which are especially useful for coating and impregnating wood and wood products to impart a high degree of acid resistance to said coated or impregnated materials.

It is well known that wooden products when used under highly acid conditions rapidly deteriorate to the point of breakdown, which requires their replacement after a relatively short in-stream life. This sensitivity of wooden products to highly acid conditions has resulted in the gradual replacement of such products by stainless steel or rubberized products capable of a much longer in-stream life.

Conventional thermosetting phenolic systems when used to impregnate wood or wood products to impart acid resistance have displayed two general drawbacks. Primarily, the acid resistance imparted has not been of great enough magnitude to restore the treated wooden products to a competitive position with similar stainless steel or rubberized products and secondly the curing temperatures required are of such a magnitude that there is the possibility of damage to the wood cellular structure.

My invention comprehends acid-resistant coating and impregnating compositions which themselves are believed to be new, and base materials or articles formed especially of wood or wood products coated or impregnated with such compositions, and methods of producing same. Condensation products embodying my invention display vastly superior resistance to acids as compared with conventional acid-catalyzed phenolic systems.

Generally speaking, I have found that dibasic-acid-modified alkali-condensed phenol-aldehyde and analogous resins prepared in accordance with my invention are especially valuable for the purpose referred to above. A number of such acid-modified resins have been produced and tested by me and have shown high acid resistance properties.

In general, I find that optimum acid resistance is obtained with the use of oxalic acid alone or with another dicarboxylic acid as the resin modifier under baking conditions coming within a range hereinafter indicated.

An important advantage accruing to my invention is that wood and wood products treated according to my invention are rendered highly acid resistant without risk of damage to the cellular structure of the wood.

In determining chemical resistance I have used a highly accelerated test. W. & R. Balston extraction thimbles were impregnated with a given formulation and baked, which thimbles so treated were suspended in acid baths, both dilute and concentrated, maintained at 220° F. for 16 hours and at room temperature for 8 hours in each 24 hour cycle. The time required for penetration of the acid through the walls of the thimble was taken as an indication of the acid resistance, the penetration time for an uncoated thimble being 3 seconds.

The value of the accelerated thimble test has been tentatively confirmed by laboratory and field testing. For example, in testing a certain formulation, a treated wood sample showed little damage after 336 hours, whereas a thimble similarly treated broke down after 61 hours.

Most of my comparative date is based on the use of 25% sulphuric acid as the test agent. However, I have found substantially equal results with other acids and at various acid concentrations.

My invention is applicable generally to phenol-aldehyde resins, which are recognized as an extensive class suitable for use as coatings. Typical examples of such products to which my invention is applicable are the following 1:2 phenol - formaldehyde alkali - condensed resins:

Formula A: | Moles
--- | ---
Phenol | 1
Formaldehyde | 2
Sodium hydroxide | 0.3

Formula B: | 
--- | ---
Phenol (10% amyl phenol) | 1
Formaldehyde | 2
Sodium hydroxide | 0.3

The resins employed in my invention may be prepared according to standard cooking procedures known in the art.

It should be understood that the above examples are merely illustrative of "phenolic systems" to which my invention is applicable and which may include a wide variety of resins not only of phenol-formaldehyde but also of aldehyde condensations of aliphatic phenols such as amyl phenol, butyl phenol, nonyl phenol, as well as bis-phenol, resorcinol, cresol, melamine, urea, etc. Hence, use herein of the expression "aldehyde condensation resins" should be understood as including the various types of condensation products, which are considered equivalents for my purposes.

My investigations have shown that aldehyde condensation resins modified by a relatively high proportion of a dicarboxylic acid and cured under certain conditions, show astonishingly high acid resistance. The presence of a substantial proportion of oxalic acid in the acid modifier produces optimum results.

I am aware that acids, including dicarboxylic acids, have been used as catalysts in the synthesis of phenolic resins, but ordinarily not in excess of 15% based on resin solids, and usually below this figure. The use of such low quantities of acid contributes very little in the way of acid resistance to the product and may even reduce such resistance as compared with the original phenolic. Accordingly, the results of using much larger quantities of dicarboxylic acid, as contemplated for my purpose, are astonishing.

To illustrate the effect of low acid concentrations as a resin modifier, I found that the use of 7.2% of oxalic acid, based on resin solids, with Formula B above, and baked at 160° F. for 75 minutes, gave a resistance of only 12 seconds against 25% sulphuric acid; 15% of oxalic gave only 28 seconds. When the amount of oxalic was raised to 30% the acid resistance jumped to 12.8 hours, with an optimum of 97.5 hours with 50% oxalic, the baking conditions being the same as above indicated.

It has previously been suggested that polycarboxylic acids alone or together with a thermosetting resin may be used to impregnate felted cellulose fiber boards for dimensional stabilization. (Ericks, 2,629,648, February 24, 1953.) Such suggestions are considered remote from my invention as to purpose, procedure and result.

An important feature of my invention from the standpoint of acid resistance lies in the temperature and period of cure, as will be described in further detail herebelow.

After preparation of the acid-modified phenolic resin, and application thereof to wood or other base material or article, the condensation product is cured or baked in the customary manner for thermosetting resins, except for the specific conditions of time and temperature peculiar to my invention, as described below, to accomplish optimum acid-resistance in the finished coating.

Although various methods of coating or impregnating may be used, I have found with dried California redwood that immersion in the acid-modified phenolic for about 5 minutes is adequate, followed by baking as hereinafter described. However, generally speaking, any method of application may be used which will transfer a fluid dibasic acid modified resin to a wooden surface, such as brushing, flowing, spraying, dipping, pressure or vacuum impregnation, etc.

The method of application of the dibasic acid modified resin depends upon the particular requirements of the product to be treated. For instance, if the treated wooden products are to be used under highly abrasive as well as highly acid conditions, the dibasic acid modified resin should be applied by pressure or vacuum impregnation to effect the transfer of the acid resistant composition to the very core of the wood or wooden products. However, if abrasion is absent, the selection of brushing, spraying, flowing, dipping, etc., would be dependent upon the method of application preferred by the persons making the application.

Generally dipping achieves a greater depth of penetration of the acid resistant dibasic acid modified resin into the cellular structure of the wood or wooden products, than can be achieved by brushing, spraying, or flow coating.

As suggested above, according to my invention, optimum results are obtained when the acid modifier is oxalic acid, alone or together with another one or more dicarboxylic acids, and when curing is accomplished within a temperature range of about 130° to 250° F. and preferably between about 140° and 180° F., for a period of time ranging from about 30 to 150 minutes. My studies show that baking temperatures substantially above about 200° F. even for a period as short as 50 minutes drastically reduce acid resistance, and that over-baking as to time beyond about 150 minutes also lowers the resistance.

As a general rule, the baking time decreases as the temperatures increases. However, it is impossible to express this rule with mathematical precision, as the time-temperature relation is found to vary with different systems. For example, a 50% oxalic acid-phenol formaldehyde impregnant will cure best at 150° F. for 90 minutes, while a 50% ovalic-maleic (1 to 1) combination with the same resin cures best at about 155–160° F. for 80 minutes.

The resin-modifying dicarboxylic acid employed in accordance with my invention preferably constitutes from about 25% to 100% by weight of the resin solids. Below about 25% the acid resistance is relatively slight.

Although oxalic acid alone as the resin-modifying agent produces markedly superior acid resistance, I find that if oxalic acid is combined with one or more other dicarboxylic acids, with the oxalic present preferably in a proportion of about 50% or more as compared with the total dicarboxylic acid or acids present, a marked acid resistance is imparted to the resin. However, using 16% oxalic acid and 32% maleic acid gives 194 hours acid resistance when baked 75 minutes at 200° F. Thus, the oxalic may be as little as one-third of the total acids present.

Good acid resistance is imparted according to a variety of curing conditions applied to the same acid-modified phenolic system embodying my invention. The following are examples of curing conditions which were found to impart acid resistance in the range of hours against 25% sulphuric acid at 200° F.:

*Baking conditions*

120 min. @ 140° F.
90 min. @ 150° F.
82 min. @ 155° F.
75 min. @ 160° F.
45 min. @ 200° F.

In general, the greatest resistance results from baking at 150° F. for 90 minutes.

The following examples further illustrate specific phenolic coatings modified with 50% oxalic acid alone and cured under the conditions indicated which show good acid resistance.

| Base resin: | Baking conditions |
|---|---|
| Phenol-formaldehyde | 90 min., 150° F. |
| Phenol-formaldehyde | 75 min., 200° F. |
| Cresol-formaldehyde | 90 min., 150° F. |
| Melamine-formaldehyde | 90 min., 150° F. |

The following examples illustrate the use of oxalic acid together with the indicated amounts of another dicarboxylic acid wherein the oxalic constitutes from about one-third to two-thirds of the total acids present, the percentages specified below as usual, being based on resin solids:

| Percent Oxalic Acid | Percent Maleic Anhydride | Baking Conditions |
|---|---|---|
| 16 | 32 | 75 min., 200° F. |
| 16 | 32 | 30 min., 250° F. |
| 32 | 16 | 75 min., 200° F. |
| 32 | 16 | 30 min., 250° F. |
| | Percent Succinic Anhydride | |
| 16 | 32 | 75 min., 200° F. |
| 16 | 32 | 30 min., 250° F. |
| 32 | 16 | 75 min., 200° F. |
| 32 | 16 | 30 min., 250° F. |
| | Percent Adipic Acid | |
| 32 | 16 | 75 min., 200° F. |
| 32 | 16 | 30 min., 250° F. |

The optimum acid resistance is obtained with about 50% oxalic acid, based on resin solids. For example, when Formula A is modified with 50% oxalic the following results were obtained according to the bake conditions indicated, using 25% sulphuric acid as the test agent:

| Bake— | Resistance |
|---|---|
| 90 min., 150° F. | hrs__ 61 |
| 30 min., 250° F. | min__ 110 |

Formula B, modified with 50% oxalic, showed the following:

| Bake— | Resistance |
|---|---|
| 90 min., 150° F. | hrs__ 400 |
| 30 min., 250° F. | hrs__ 10½ |

The cured resins embodying my invention are rock hard and light in color.

Small amounts of diamyl phenol may be added, say from around 3 to 12 percent based on resin solids, with no appreciable plasticizing effect while markedly increasing the acid resistance. The hardnes is not reduced by such addition. This effect has been especially marked when diamyl phenol is added to phenolics modified with 45–55% of oxalic acid, based on resin solids.

I am unable at this time to explain with any assurance of correctness any theory for the astonishing results obtained in accordance with my invention.

Various changes coming within the spirit of my invention may suggest themselves to those skilled in the art; hence I do not wish to be limited to the specific examples specifid herein or uses mentioned except to the extent indicated in the appended claims.

I claim:

1. The method of inhibiting the deterioration of a cellulose-containing base normally deteriorating in the presence of acid comprising conferring acid resistance upon said cellulose-containing base by treating the latter with a liquid impregnating composition formed from a mixture of (a) a thermosetting resin selected from the group of resins consisting of phenol-aldehyde and amine-aldehyde resins, and (b) at least one dicarboxylic acid present in the mixture in an amount between about 25% and about 100% based on resin solids, at least one-third of the dicarboxylic acid-content being oxalic acid, and drying and baking the so-treated cellulose-containing base at a temperature of between 130° F. and 200° F.

2. The method of inhibiting the deterioration of a cellulose-containing base normally deteriorating in the presence of acid comprising conferring acid resistance upon said cellulose-containing base by treating the latter with a liquid impregnating composition formed from a mixture of (a) a thermosetting resin selected from the group of resins consisting of phenol-aldehyde and amine-aldehyde resins, and (b) at least one dicarboxylic acid present in the mixture in an amount between about 25% and about 55% based on resin solids, at least one-third of the dicarboxylic acid-content being oxalic acid, and drying and baking the so-treated cellulose-containing base at a temperature above 130° F. and below the temperature at which the acid resistance conferred by baking is impaired.

3. The method of inhibiting the deterioration of a cellulose-containing base normally deteriorating in the presence of acid comprising conferring acid resistance upon said cellulose-containing base by treating the latter with a liquid impregnating composition formed from a mixture of (a) a thermosetting resin selected from the group of resins consisting of phenol-aldehyde and amine-aldehyde resins, and (b) at least one dicarboxylic acid present in the mixture in an amount between about 25% and about 100% based on resin solids, at least one-third of the dicarboxylic acid-content being oxalic acid, and drying and baking the so-treated cellulose-containing base at a temperature between 130° F. and below the temperature at which the acid resistance conferred by baking is impaired.

4. The method defined in claim 3, in which the cellulose-containing base is selected from the group consisting of wood and wood products.

5. The method defined in claim 3, in which the dicarboxylic acid contains about 50% of oxalic acid.

6. An impregnating composition formed from a mixture of (a) a thermosetting resin selected from the group of resins consisting of phenol-aldehyde and amine-aldehyde resins, and (b) at least one dicarboxylic acid present in the mixture in an amount between about 25% and about 100% based on resin solids, at least one-third of the dicarboxylic acid-content being oxalic acid.

7. An impregnating composition comprising a mixture of (a) a thermosetting resin selected from the group of resins consisting of phenol-aldehyde and amine-aldehyde resins, and (b) at least one dicarboxylic acid present in the mixture in an amount between about 25% and about 55% based on resin solids, at least one-third of the dicarboxylic acid-content being oxalic acid.

8. A cellulose-containing base which is resistant to deterioration by action of acid, said cellulose-containing base carrying the heat-reacted impregnating composition formed from a mixture of (a) a thermosetting resin selected from the group of resins consisting of phenol-aldehyde and amine-aldehyde resins, and (b) at least one dicarboxylic acid present in the mixture in an amount between about 25% and about 100% based on resin solids, at least one-third of the dicarboxylic acid-content being oxalic acid.

9. A product as defined in claim 8 in which the cellulose-containing base is selected from the group consisting of wood and wood products.

10. A cellulose-containing base which is resistant to deterioration by action of acid, said cellulose-containing base carrying the heat-reacted impregnating composition formed from a mixture of (a) a thermosetting resin selected from the group of resins consisting of phenol-aldehyde and amine-aldehyde resins, and (b) at least one dicarboxylic acid present in the mixture in an amount between about 25% and about 55% based on resin solids, at least one-third of the dicarboxylic acid-content being oxalic acid.

11. The method of producing a cellulose-containing base have a coating of an acid resistant substance comprising treating a thermosetting resin with at least one dicarboxylic acid, at least one-third of said acid-content consisting of oxalic acid, the dicarboxylic acid being present in the resulting mixture in an amount between about 25% and about 100% based on resin solids, said thermosetting resin being selected from the group of resins consisting of phenol-aldehyde and amine-aldehyde resins, applying the so acid-modified resin to the surface of the cellulose-containing base and baking the so-treated base at a temperature between the range of about 130° F. and 250° F. for a period of between 30 and 150 minutes, the time of baking not exceeding about 50 minutes when the temperature is substantially above about 200° F., the conditions of temperature and time being such that the acid resistance conferred by baking is not impaired.

12. A method as in claim 11, wherein the oxalic acid is the acid ingredient and constitutes about 50 percent of the resin solids, and the bake is from about 30 to 90 minutes at about 150° to 250° F.

13. A method as in claim 11, wherein about 3 to 12 percent of diamyl phenol, based on resin solids, is included, and about 45–55 percent oxalic acid, based on resin solids, constitutes the acid ingredient.

14. A method as in claim 11, wherein about 50 percent oxalic acid constitutes the acid ingredient, and the bake is at about 150° F. for about 90 minutes.

15. A method as in claim 11, wherein the bake is at a temperature of about 140° to 200° F. for about 45 to 120 minutes.

16. A method as in claim 15, wherein oxalic acid is the acid ingredient.

17. A liquid coating composition especially suitable for application to wood and other materials, said composition comprising an aldehyde condensation resin modified by the addition of at least about 25% of an ingredient consisting of at least one dicarboxylic acid, at least ⅓ of which ingredient is oxalic acid, which composition, when cured, will be highly resistant to acid attack, said aldehyde condensation resin being selected from the group consisting of phenol-aldehyde and amine-aldehyde resins.

18. A composition as in claim 17, wherein the acid ingredient is about 50 percent of the resin solids, oxalic acid being about one-third and maleic acid about two-thirds of said ingredient.

19. In combination, a wood base coated with a composition as in claim 17.

References Cited in the file of this patent

UNITED STATES PATENTS

| | | |
|---|---|---|
| 2,233,875 | Schmidt et al. | Mar. 4, 1941 |
| 2,629,648 | Ericks | Feb. 24, 1953 |